US006791652B2

(12) United States Patent
Yang et al.

(10) Patent No.: US 6,791,652 B2
(45) Date of Patent: Sep. 14, 2004

(54) ARRAY SUBSTRATE FOR IPS MODE LIQUID CRYSTAL DISPLAY DEVICE AND METHOD FOR FABRICATING THE SAME

(75) Inventors: Yun Suk Yang, Busan (KR); Myung Ho Do, Gyeongsangbuk-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/320,625

(22) Filed: Dec. 17, 2002

(65) Prior Publication Data

US 2003/0117560 A1 Jun. 26, 2003

(30) Foreign Application Priority Data

Dec. 24, 2001 (KR) .................................... 2001-84590

(51) Int. Cl.[7] ........................ G02F 1/1343; G02F 1/136
(52) U.S. Cl. ............................ 349/141; 349/38; 349/43
(58) Field of Search ................................ 349/141, 143, 349/42–43, 38, 139

(56) References Cited

U.S. PATENT DOCUMENTS

| 5,598,285 A | 1/1997 | Kondo et al. |
| 5,745,207 A | 4/1998 | Asada et al. |
| 5,838,037 A | 11/1998 | Masutani et al. |
| 5,946,060 A | 8/1999 | Nishiki et al. |
| 5,990,987 A | 11/1999 | Tanaka |
| 6,028,653 A | 2/2000 | Nishida et al. |
| 6,097,454 A | 8/2000 | Zhang et al. |
| 2002/0171796 A1 * | 11/2002 | Kim ........................... 349/141 |

FOREIGN PATENT DOCUMENTS

| JP | 9005764 A2 | 1/1997 |
| JP | 9073101 A2 | 3/1997 |
| JP | 9101538 A2 | 4/1997 |
| JP | 9105908 A2 | 4/1997 |

OTHER PUBLICATIONS

R. Kiefer, et al., "In–Plane Switching of Nematic Liquid Crystals," Japan Display, 1992, pp. 547–550.
M. Oh–e, et al., "Principles and Characteristics of Electro–Optical Behaviour with In–Plane Switching Mode," Asia Display, 1995, pp. 577–580.
M. Ohta, et al., "Development of Super–TFT–LCDs with In–Plane Switching Display Mode," Asia Display, 1995, pp. 707–710.
S. Matsumoto, et al., "Display Characteristic of In–Plane–Switching (IPS) LCDs and a Wide–Viewing–Angle 14.5–in. IPS TFT–LCD." Euro Display, 1996, pp. 445–448.
H. Wakemoto, et al., "An Advanced In–Plane–Switching Mode TFT–LCD." Science I. D. 1997, pp. 929–932.

(List continued on next page.)

Primary Examiner—Dung Nguyen
(74) Attorney, Agent, or Firm—McKenna Long & Aldridge LLP (57) ABSTRACT

An array substrate for in-plane switching (IPS) mode liquid crystal display (LCD) device includes a substrate having a plurality of pixel regions, a plurality of gate lines and a plurality of common lines in a horizontal direction. A plurality of data lines cross the gate line and the common line, the data line in a crossing portion between the data line and the gate line and between the data line and the common line having a substantially the same line width as the data line. A thin film transistor is at a crossing point of the gate and data lines. A pixel electrode has an extension portion, a plurality of vertical portions and a horizontal portion. A common electrode has a plurality of vertical portions and a horizontal portion. A transparent electrode pattern covers the horizontal portion of the pixel electrode.

20 Claims, 5 Drawing Sheets

OTHER PUBLICATIONS

S. H. Lee. et al., "*High-Transmittance, Wide-Viewing-Angle Nematic Liquid Crystal Display controlled by Fringe-Field Switching.*" Asia display, 1998, pp. 371–374.

S. Endoh, et al., "*Advanced 18.1-inch Diagonal Super-T-FT-LCDs with Mega Wide Viewing Angle and Fast Response Speed of 20ms.*" IDW, 1999, pp. 187.

* cited by examiner

ARRAY SUBSTRATE FOR IPS MODE LIQUID CRYSTAL DISPLAY DEVICE AND METHOD FOR FABRICATING THE SAME

This application claims the benefit of Korean Patent Application No. 2001-84590, filed on Dec. 24, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for In-Plane Switching (IPS) mode liquid crystal display device and fabricating method for the same in order to prevent a break of a data line.

2. Discussion of the Related Art

A typical liquid crystal display (LCD) device uses optical anisotropy and polarization properties of liquid crystal molecules. The liquid crystal molecules have a definite orientation order in alignment resulting from their thin and long shapes. The alignment direction of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

Active matrix LCDs, in which the thin film transistors and the pixel electrodes are arranged in the form of a matrix, are widely used because of their high resolution and superiority in displaying moving images. An array substrate for the in-plane switching (IPS) mode liquid crystal display (LCD) device and the fabricating method for the same will be described hereinafter with reference to the following figures.

Figure 1:
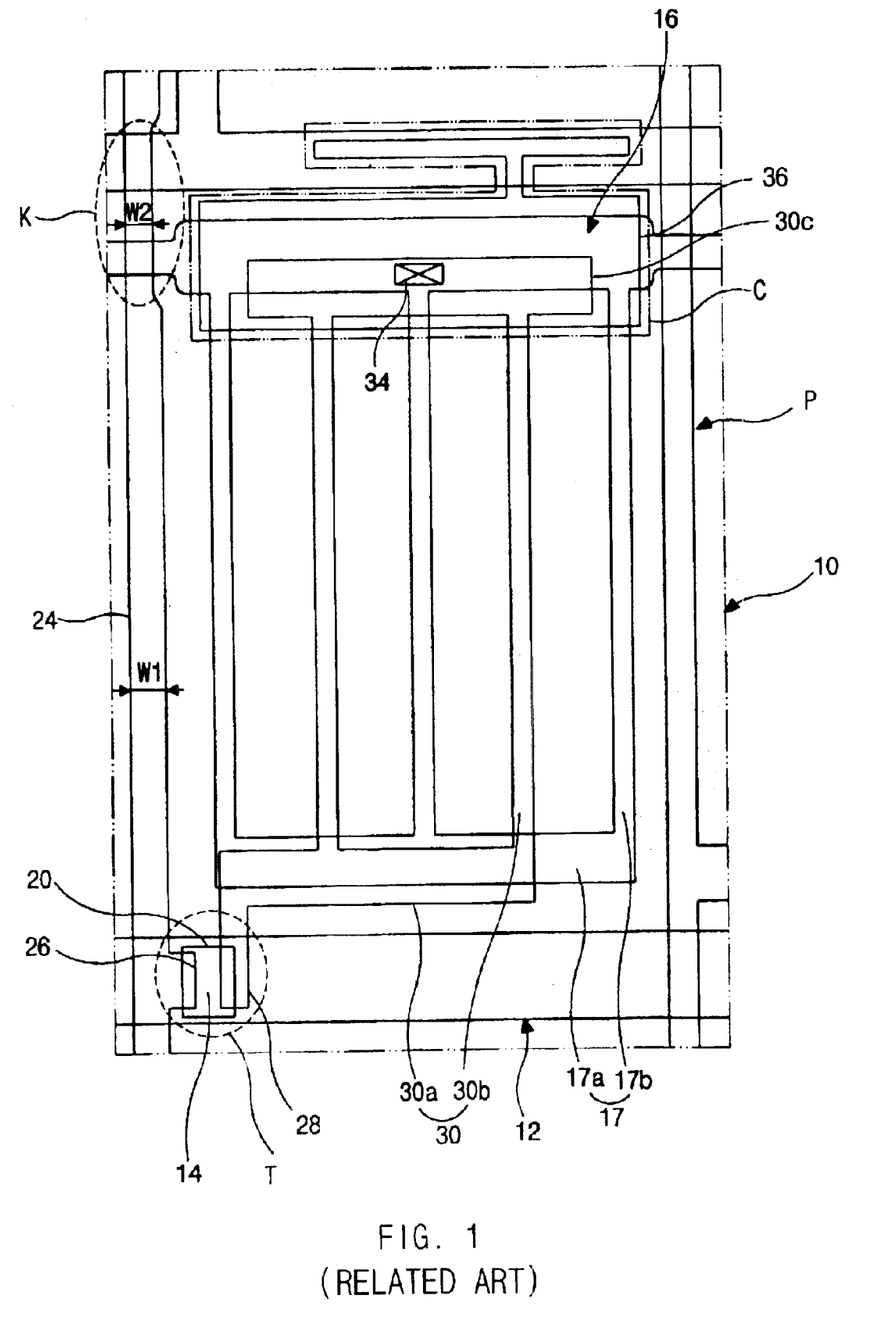
FIG. 1 is a plan view of a pixel of an array substrate for a related art in-plane switching (IPS) mode liquid crystal display (LCD) device.

FIG. 1 is a plan view of a pixel of an array substrate for a related art in-plane switching (IPS) mode liquid crystal display (LCD) device. In FIG. 1, a plurality of gate lines 12, common lines 16 and data lines 24 are formed on an array substrate 10 for the related art in-plane switching (IPS) mode liquid crystal display (LCD) device. The common line 16 is spaced apart from the gate line 12 and the data line 24 crosses the gate line 12 and the common line 16. The data line 24 defines a pixel region "P" by crossing the gate line 12. A thin film transistor is formed in a crossing point of the gate line 12 and the data line 24. The thin film transistor includes a gate electrode 14, an active layer 20, a source electrode 26 and a drain electrode 28. The active layer 20, the source electrode 26 and the drain electrode 28 are formed over the gate electrode 14. The source electrode 26 communicates with the data line 24 and the gate electrode 14 communicates with the gate line 12. A pixel electrode 30 and a common electrode 17 are formed in the pixel region "P" in FIG. 1. The pixel electrode 30 is electrically connected to the drain electrode 28. The common electrode 17 is formed parallel with the pixel electrode 30. The pixel electrode 30 includes an extension portion 30a, a plurality of vertical portions 30b and a horizontal portion 30c. The extension portion 30a is extended from the drain electrode 28 and the plurality of the vertical portions 30b is vertically extended from the extension portion 30a. The vertical portions 30b are spaced from each other. The horizontal portion 30c connects the vertical portions 30b into one portion. The common electrode 17 includes a plurality of vertical portions 17b and a horizontal portion 17a. The vertical portions 17b are vertically extended from the common line 16 and arranged in an alternating order with the vertical portions 30b of the pixel electrode 30. The horizontal portion 17a connects the plurality of the vertical portions 17b into one portion. The vertical portion 17b of the common electrode 17 is spaced apart from the data line 24. A transparent electrode pattern 36 contacts the horizontal portion 30c of the pixel electrode 30 through a contact hole 34. The transparent electrode pattern 36 is formed over the gate line 12 adjacent to the common line 16 and extended to the gate line 12. An auxiliary storage capacitor "C" is formed over the gate line 12 and the common line 16 and forms a dual storage capacitor structure. A line width W2 of the data line 24 in a portion where the data line 24 crosses the gate line 12 and the common line 16 is narrower than a line width W1 of the data line 24 in other areas. The reason is to minimize a fluctuation of the storage capacitance by reducing an overlapped area between the data line 24 and the gate line 12 and between the data line 24 and the common line 16. However, the line width W2 of the data line 24, which is patterned in a crossing portion "K" cannot overcome a step difference in the crossing portion "K". Accordingly, the data line 24 may be severed owing to the step difference in the crossing portion "K".

Figure 2:
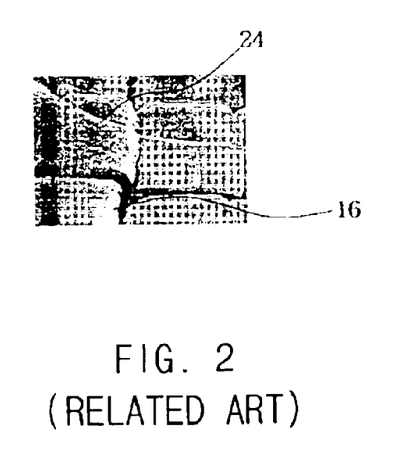
FIG. 2 is a microphotograph of K portion of FIG. 1 illustrating a severing of a data line in a crossing portion between the data line and a common line.

FIG. 2 is a microphotograph of "K" portion of FIG. 1 illustrating a severing of the data line in a crossing portion between the data line 24 and the common line 16. The microphotograph illustrates that the data line 24 is severed in the crossing portion "K" between the data line and the common line because the data line 24 cannot overcome the step difference between the data line 24 and the common line 16. The array substrate 10 that has a served data line 24 is not available and this subsequently decreases a manufacturing yield.

SUMMARY OF THE INVENTION

Accordingly, the present invention is directed to an array substrate for in-plane switching (IPS) mode liquid crystal display (LCD) device and method for fabricating the same that substantially obviates one or more of problems due to limitations and disadvantages of the related art.

An advantage of the present invention is to provide the array substrate for in-plane switching (IPS) mode liquid crystal display (LCD) device in order to prevent a data line from being severed owing to a step difference between the data line and a common line.

Another advantage of the present invention is to provide a fabricating method for the array substrate for in-plane switching (IPS) mode liquid crystal display (LCD) device in order to prevent a data line from being severed owing to a step difference between the data line and a common line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for in-plane switching (IPS) mode liquid crystal display (LCD) device comprises a substrate including a plurality of pixel regions; a plurality of gate lines and a plurality of common lines in a horizontal direction; a plurality of data lines crossing the gate line and the common line, the data line in a crossing portion between the data line and the gate line and between the data line and the common line having a substantially same line width as the data line; a thin film transistor at a crossing point of the gate and data lines; a pixel electrode having an extension portion, a plurality of vertical portions and a horizontal portion; a common electrode having a plurality of vertical portions and a horizontal portion; and a transparent electrode pattern covering the horizontal portion of the pixel electrode. The gate line and the common line are formed on a same layer using the same material. The gate line and the common line include one of aluminum (Al), aluminum alloy (Al alloy), tungsten (W), molybdenum (Mo) and chromium (Cr). The common line and the horizontal portion of the pixel electrode have an interposed insulation layer and form a first storage capacitor. The transparent electrode pattern contacting the horizontal portion of the pixel electrode and the gate line have an interposed insulation layer and form a second storage capacitor. The source electrode has an U-shape. The active layer is extended under the data line. The line width of the data line is between 8 $\mu$m to 10 $\mu$m.

A fabrication method of an array substrate for in-plane switching (IPS) mode liquid crystal display (LCD) device comprises forming a plurality of gate lines and a plurality of common lines on a substrate; forming a plurality of data lines crossing the gate line and the common line, the data line in a crossing portion between the data line and the gate line and between the data line and the common line having a substantially same line width as the data line; forming a thin film transistor at a crossing point of the gate and data lines; forming a pixel electrode having an extension portion, a plurality of vertical portions and a horizontal portion; forming a common electrode having a plurality of vertical portions and a horizontal portion; and forming a transparent electrode pattern covering the horizontal portion of the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiment of the present invention, example of which is illustrated in the accompanying drawings.

Figure 3:
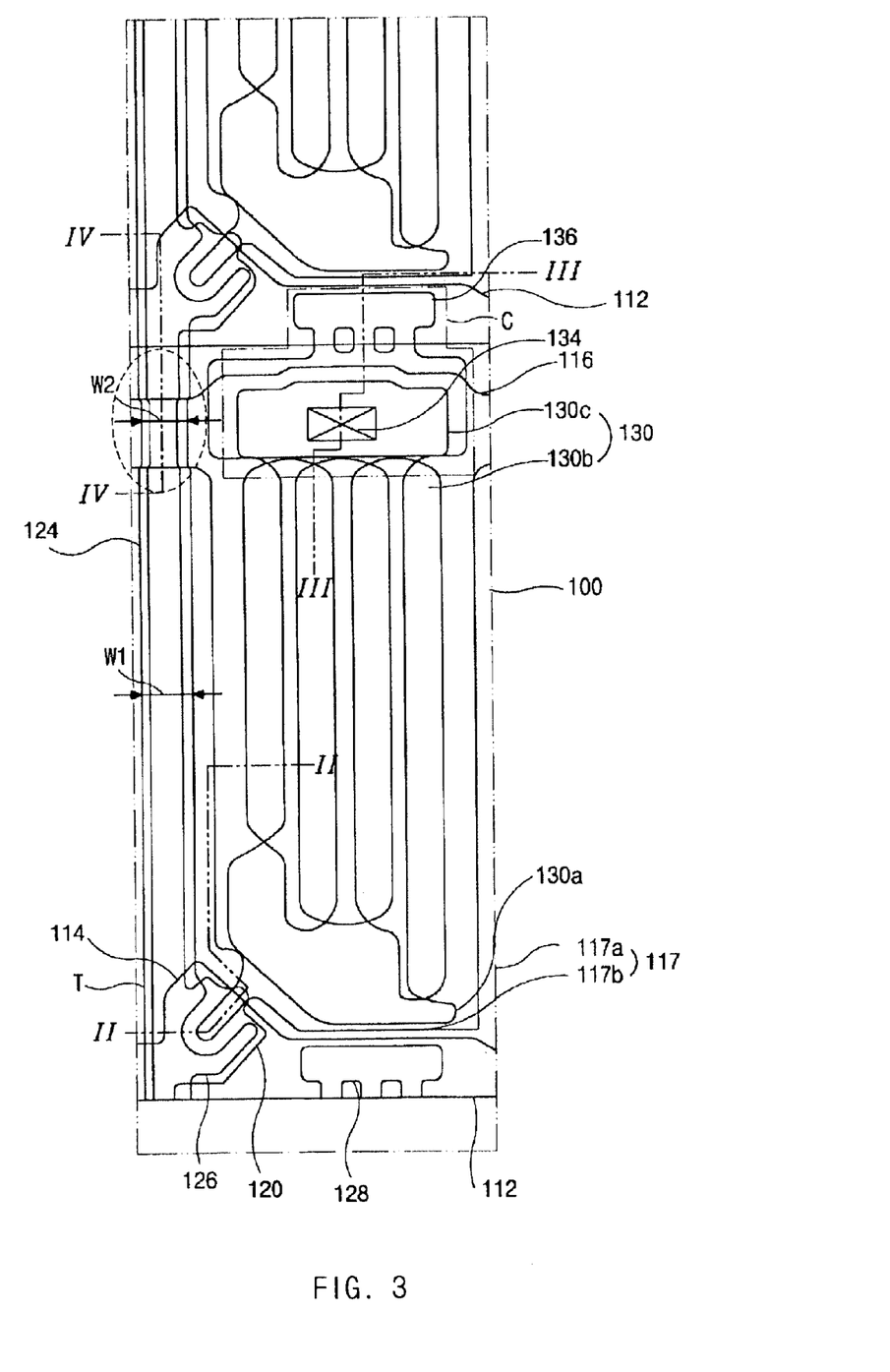
FIG. 3 is a plan view of a pixel of an array substrate for an in-plane switching (IPS) mode liquid crystal display (LCD) device according to the present invention.

FIG. 3 is a plan view of a pixel of an array substrate for an in-plane switching (IPS) mode liquid crystal display (LCD) device according to the present invention. In FIG. 3, a plurality of gate lines 112 and a plurality of common lines 116 are formed on an array substrate 100 in a horizontal direction. The common line 116 is parallel with the gate line 112 and spaced apart from the gate line 112. A data line 124 crosses the gate line 112 and the common line 116 and defines a pixel region "P" by crossing the gate line 112. Unlike the related art, a line width W2 of the data line 124 in a crossing portion between the data line 124 and the gate line 112 and between the data line 24 and the common line 116 is substantially the same as a line width W1 of the data line 124 in other areas according to the present invention. The line width W1 and W2 are patterned to have a width ranging from 8 $\mu$m~10 $\mu$m. A thin film transistor "T" is formed near the crossing point of the gate line 112 and the data line 124. The thin film transistor "T" includes a gate electrode 114, a semiconductor layer 120, a source electrode and a drain electrode 128. The source electrode 126 communicates with the data line 124 and the gate electrode 114 communicates with the gate line 112. The source electrode 126 has a U-shape and surrounds the drain electrode 128 that is spaced apart from the source electrode 126. A semiconductor line 121 is formed under the data line 124. The semiconductor line 121 is extended from the semiconductor layer 120 along the data line 124 in order to improve an adhesion property of the data line 124. A pixel electrode 130 and a common electrode 117 are formed in the pixel region "P". The pixel electrode 130 is connected to the drain electrode 128. The common electrode 117 is arranged in an alternating pattern with the pixel electrode 130 and connected to the common line 116. The pixel electrode 130 includes an extension portion 130a, a vertical portion 130b and a horizontal portion 130c. The extension portion 130a is extended from the drain electrode 128 and a plurality of vertical portions 130b is vertically extended from the extension portion 130a. The plurality of the vertical portions 130b is spaced from each other. The horizontal portion 130c connects the plurality of the vertical portions 130b into one portion. The common electrode 117 includes a plurality of vertical portions 117b and a horizontal portion 117a. The plurality of vertical portions 117b is vertically extended from the common line 116 and arranged in an alternating pattern with the vertical portions 130b of the pixel electrode 130. The horizontal portion 117a connects the plurality of vertical portions into one portion. A transparent electrode pattern 136 contacts the horizontal portion 130c of the pixel electrode 130 through a contact hole 134. The transparent electrode pattern 136 is formed over the gate line 112 adjacent to the common line 116 and extended to the gate line 112. A storage capacitor "C" is formed over the gate line 112 and the common line 116 and forms a dual storage capacitor structure. If the line width W2 of the data line 124 in the crossing portion of the data line 124 and the common line 116 is formed to have substantially the same width of about 8 $\mu$m~10 $\mu$m as the line width W1 of the data line 124 in the pixel region "P", a fluctuation of a storage capacitance of the storage capacitor "C" does not affect the driving of a liquid crystal panel, which is generated by an overlapped area between the data line 124 and the gate line 112 and between the data line 124 and the common line 116.

Figure 4A:
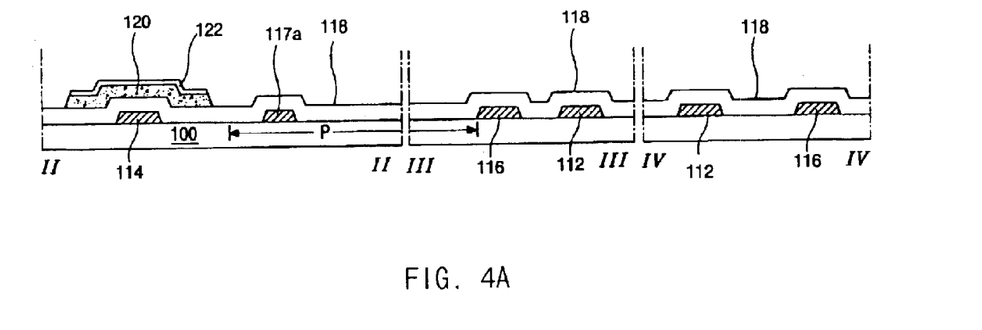
FIGS. 4A to 4D are cross-sectional views taken along II—II, III—III and IV—IV of FIG. 3 illustrating a fabrication process according to a fabrication sequence of the present invention.
Figure 4B:
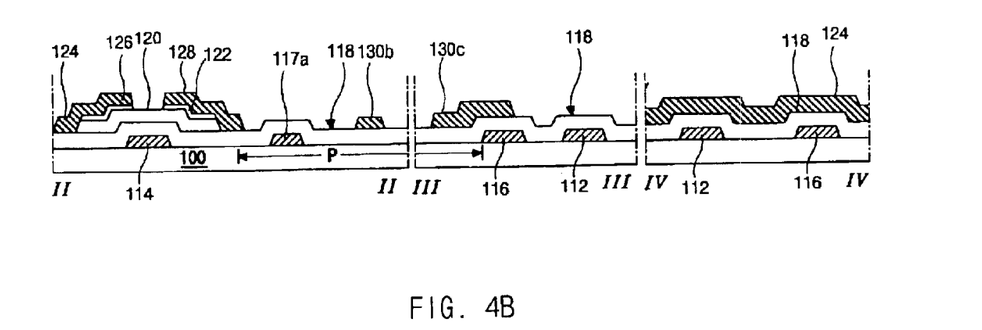
Figure 4C:
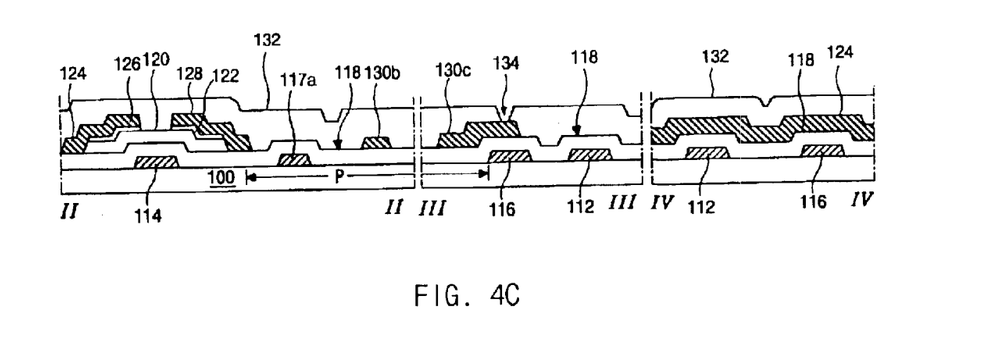

A fabrication method of an array substrate for in-plane switching (IPS) mode liquid crystal display (LCD) device will be described hereinafter with reference to figures. FIGS. 4A to 4C are cross-sectional views taken along II—II, III—III and IV—IV of FIG. 3 illustrating a fabrication process according to a fabrication sequence of the present invention. In FIG. 4A, the gate line 112, the common line 116 and the common electrode 117 are formed on the array substrate 100 by depositing and patterning one of a conductive metal material including aluminum (Al), aluminum alloy (Al alloy) such as aluminum neodymium (AlNd), chromium (Cr), molybdenum (Mo) and tungsten (W), for example. The gate electrode 114 is also formed at the same time with the gate line 112. The common line 116 is spaced apart from the gate line 112 and parallel with the gate line 112. As stated above, the common electrode 117 includes the plurality of vertical portions 117b and the horizontal portion 117a. The vertical portions 117b are vertically extended from the common line 116 and the horizontal portion 117a connects the vertical portions 117b into one portion. A gate insulating layer 118 is then formed on the substrate 100 by depositing inorganic insulating material such as silicon nitride (SiNx) or silicon oxide ($SiO_2$), for example. A semiconductor layer 120 and 122 and a semiconductor line 121 are subsequently formed on the substrate 100 by depositing and patterning amorphous silicon (a-Si:H) and then doped amorphous silicon (n+a-Si:H or p+a-Si:H). The semiconductor layer comprises an active layer 120, which is formed using amorphous silicon (a-Si:H), and an ohmic contact layer 122, which is formed using doped amorphous silicon (n+a-Si:H or p+a-Si:H).

In FIG. 4B, the data line 124, the source electrode 126, the drain electrode 128 and the pixel electrode 130 are formed on the substrate 100 by depositing and patterning one of a conductive metal material including aluminum (Al), aluminum alloy (Al alloy) such as aluminum neodymium (AlNd), chromium (Cr), molybdenum (Mo) and tungsten (W), for example. The data line 124 defines the pixel region "P" by crossing the gate line 112. The source electrode 126 is formed by being extended from the data line 124 and overlapped with a part of the semiconductor layer 120 and 122. The drain electrode 128 is spaced apart from the source electrode 126. The pixel electrode 130 includes the extension portion 130a, the plurality of vertical portions 130b and the horizontal portion 130c as stated previously. As stated above, the line width W2 of the data line 124 in the crossing portion between the data line 124 and the gate line 112 and between the data line 124 and the common line 116 is 8 μm~10 μm. This line width W2 of the data line 124 is about the same as the line width W1 of the data line 124 in the pixel region "P". That is, the line width W2 of the data line 124 near in the crossing portion between the data line 124 and the gate line 112 and between the data line 124 and the common line 116 is enlarged unlike the related art array substrate for in-plane switching (IPS) mode liquid crystal display (LCD) device. The active layer 120 is exposed by etching the ohmic contact layer 122 between the source electrode 126 and the drain electrode 128.

In FIG. 4C, a passivation layer 132 is formed on the substrate 100 by depositing one of an organic insulating material including benzocyclobutene (BCB) and acryl-based resin, for example. The passivation layer 132 may be formed on the substrate 100 by depositing one of an inorganic insulating material including silicon nitride (SiNx) and silicon oxide ($SiO_2$), for example. A storage contact hole 134, which exposes a part of the horizontal portion 130c of the pixel electrode 130, is formed by patterning the passivation layer 132.

Figure 4D:
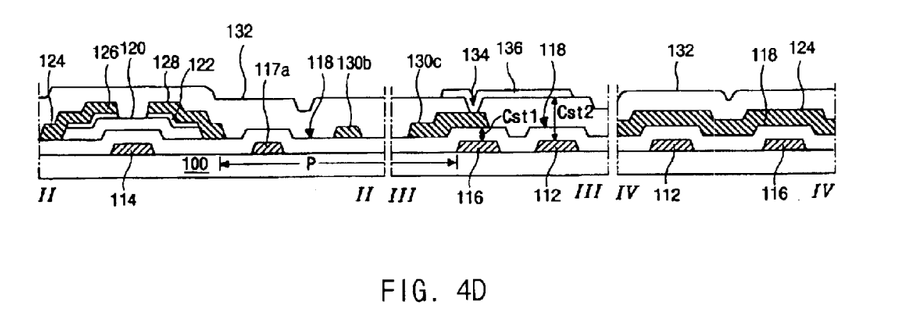

In FIG. 4D, a transparent electrode pattern 136 is over the common line 116 and the gate line 112. The transparent electrode pattern 136 contacts the exposed horizontal portion 130c of the pixel electrode 130 and is extended to the gate line 112. A dual storage capacitor is formed in this array substrate structure as shown in FIG. 4D. The dual storage capacitor includes a first storage capacitor $C_{St1}$ and a second storage capacitor $C_{St2}$. The common line 116 serves as a first capacitor electrode and the horizontal portion 130c of the pixel electrode 130 serves as a second capacitor electrode in the first storage capacitor $C_{St1}$. The transparent electrode pattern 136 serves as a first capacitor electrode and the gate line 112, which is overlapped with the transparent electrode pattern 136, serves as a second capacitor electrode in the second storage capacitor $C_{St2}$.

In the present invention, a line width of a data line in a crossing portion between the data line and a gate line and between the data line and the common line is widened.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for in-plane switching (IPS) mode liquid crystal display (LCD) device, comprising:
    a substrate having a plurality of pixel regions;
    a plurality of gate lines and a plurality of common lines in a horizontal direction;
    a plurality of data lines crossing the gate line and the common line, the data line in a crossing portion between the data line and the gate line and between the data line and the common line having a substantially same line width as the data line;
    a thin film transistor at a crossing point of the gate and data lines;
    a pixel electrode having an extension portion, a plurality of vertical portions and a horizontal portion;
    a common electrode having a plurality of vertical portions and a horizontal portion; and
    a transparent electrode pattern covering the horizontal portion of the pixel electrode.

2. The array substrate according to claim 1, wherein the gate line and the common line are formed on a same layer using the same material.

3. The array substrate according to claim 1, wherein the gate line and the common line include one of aluminum (Al), aluminum alloy (Al alloy), tungsten (W), molybdenum (Mo) and chromium (Cr).

4. The array substrate according to claim 1, wherein the common line and the horizontal portion of the pixel electrode have an interposed insulation layer and form a first storage capacitor.

5. The array substrate according to claim 1, wherein the transparent electrode pattern contacting the horizontal portion of the pixel electrode and the gate line have an interposed insulation layer and form a second storage capacitor.

6. The array substrate according to claim 1, wherein the thin film transistor includes a gate electrode, an active layer and source and drain electrodes.

7. The array substrate according to claim 6, wherein the source electrode has an U-shape.

8. The array substrate according to claim 6, wherein the active layer is extended under the data line.

9. The array substrate according to claim 1, wherein the line width of the data line is between about 8 μm to about 10 μm.

10. The array substrate according to claim 1, wherein the transparent electrode pattern contacts the horizontal portion of the pixel electrode.

11. A method for fabricating an array substrate for in-plane switching (IPS) mode liquid crystal display (LCD) device, comprising:

forming a plurality of gate lines and a plurality of common lines on a substrate;

forming a plurality of data lines crossing the gate line and the common line, the data line in a crossing portion between the data line and the gate line and between the data line and the common line having a substantially same line width as the data line;

forming a thin film transistor at a crossing point of the gate and data lines;

forming a pixel electrode having an extension portion, a plurality of vertical portions and a horizontal portion; forming a common electrode including a plurality of vertical portions and a horizontal portion; and forming a transparent electrode pattern covering the horizontal portion of the pixel electrode.

12. The method according to claim 11, wherein the gate line and the common line are formed on a same layer using the same material.

13. The method according to claim 11, wherein the gate line and the common line are formed one of aluminum (Al), aluminum alloy (Al alloy), tungsten (W), molybdenum (Mo) and chromium (Cr).

14. The method according to claim 11, wherein the common line and the horizontal portion of the pixel electrode have an interposed insulation layer and form a first storage capacitor.

15. The method according to claim 11, wherein the transparent electrode pattern contacting the horizontal portion of the pixel electrode and the gate line have an interposed insulation layer and form a second storage capacitor.

16. The method according to claim 11, wherein forming the thin film transistor at a crossing point of the gate and data lines includes:

forming a gate electrode on the substrate;

forming an active layer on the gate electrode; and forming source and drain electrodes on the active layer.

17. The method according to claim 16, wherein the source electrode has an U-shape.

18. The method according to claim 16, wherein the active layer is extended under the data line.

19. The method according to claim 11, wherein the line width of the data line is between 8 $\mu$m to 10 $\mu$m.

20. The method according to claim 11, wherein the transparent electrode pattern contacts the horizontal portion of the pixel electrode.

* * * * *